Oct. 12, 1965    ANDRÉ JEAN GIRARD    3,211,048
HIGH-INTENSITY SPECTROMETER OF GREAT SELECTIVITY
Filed May 25, 1960    8 Sheets-Sheet 1

André Girard
INVENTOR

BY Karl F. Ross
Agent

Oct. 12, 1965  ANDRÉ JEAN GIRARD  3,211,048
HIGH-INTENSITY SPECTROMETER OF GREAT SELECTIVITY
Filed May 25, 1960  8 Sheets-Sheet 3

André Girard
INVENTOR

BY Karl F. Ross
Agent

Oct. 12, 1965    ANDRÉ JEAN GIRARD    3,211,048
HIGH-INTENSITY SPECTROMETER OF GREAT SELECTIVITY
Filed May 25, 1960    8 Sheets-Sheet 4
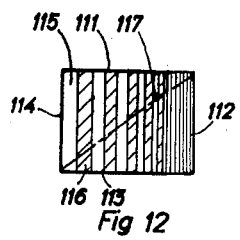
Fig 12
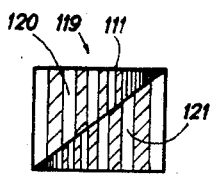
Fig 11
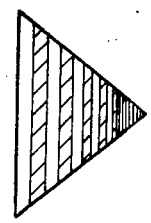
Fig 13
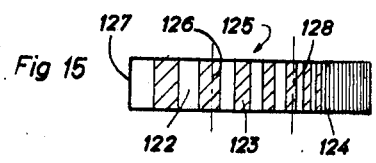
Fig 15
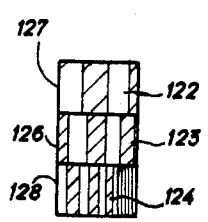
Fig 14
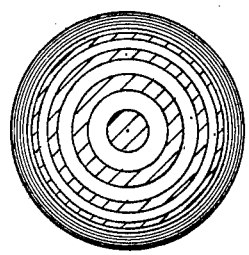
Fig 34
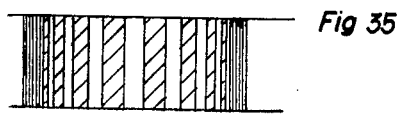
Fig 35
Fig 33
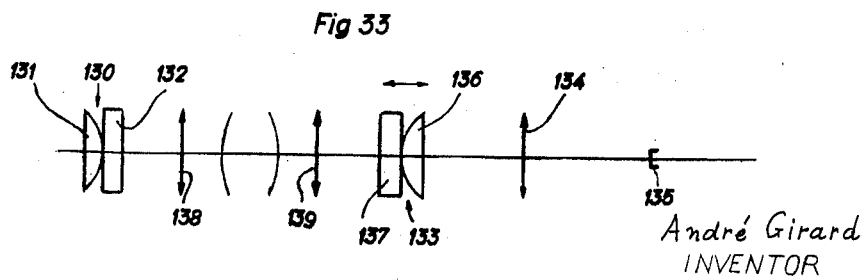
André Girard
INVENTOR
BY Karl F. Ross
Agent Oct. 12, 1965  ANDRÉ JEAN GIRARD  3,211,048
HIGH-INTENSITY SPECTROMETER OF GREAT SELECTIVITY
Filed May 25, 1960  8 Sheets-Sheet 5
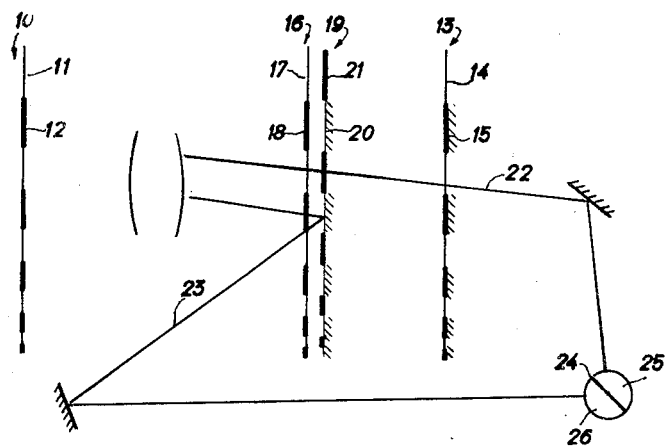
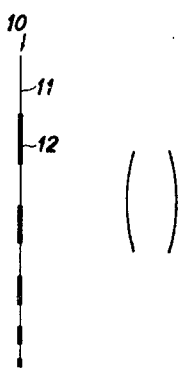
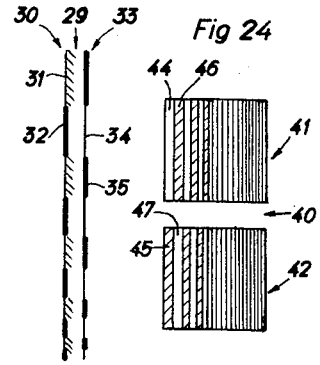
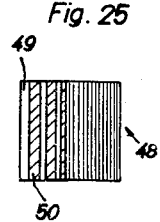
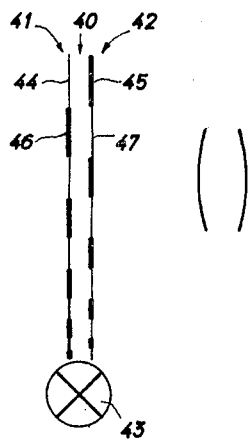
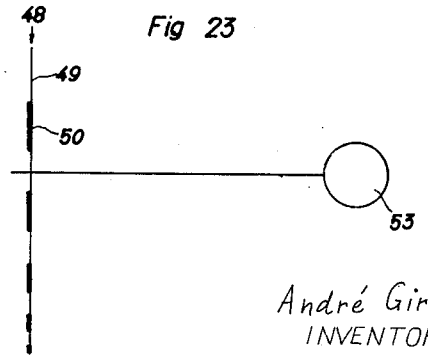
André Girard
INVENTOR
BY Karl F. Ross
Agent Oct. 12, 1965 ANDRÉ JEAN GIRARD 3,211,048
HIGH-INTENSITY SPECTROMETER OF GREAT SELECTIVITY
Filed May 25, 1960 8 Sheets-Sheet 6

André Girard
INVENTOR

BY Karl F. Ross
Agent

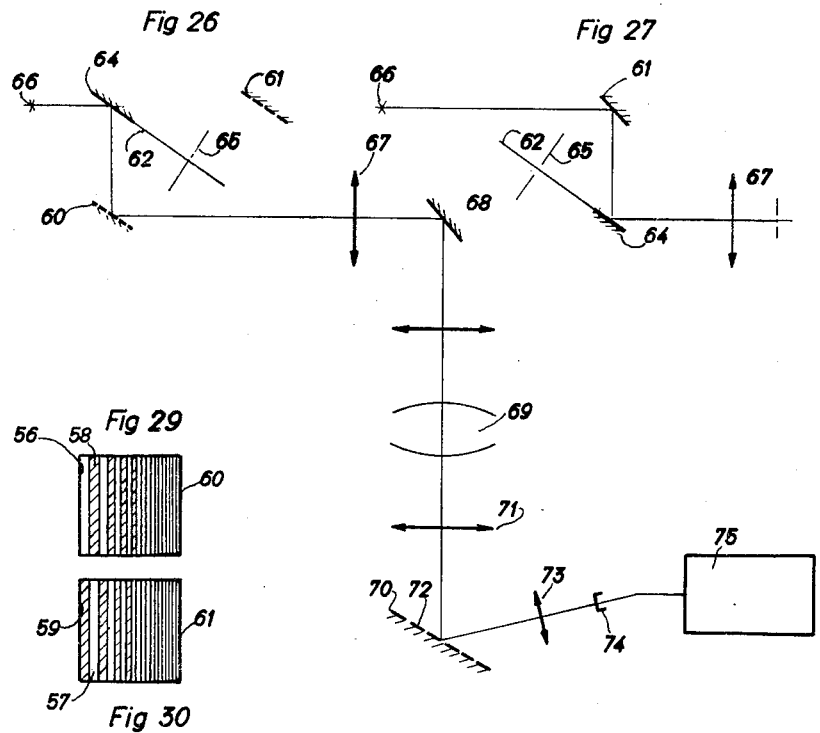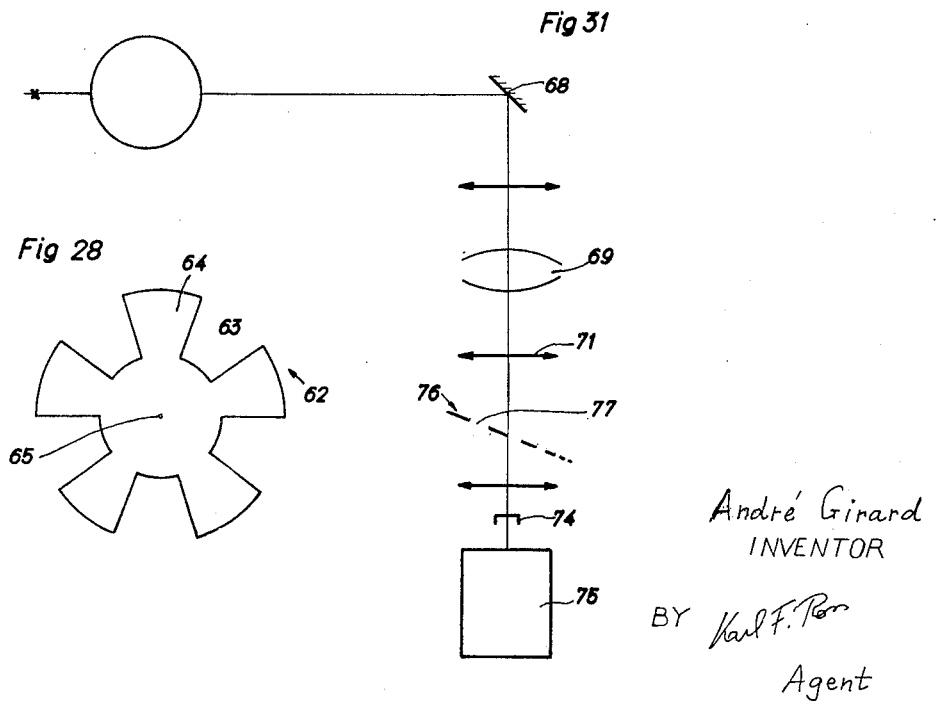

Oct. 12, 1965   ANDRÉ JEAN GIRARD   3,211,048
HIGH-INTENSITY SPECTROMETER OF GREAT SELECTIVITY
Filed May 25, 1960   8 Sheets-Sheet 8

United States Patent Office 3,211,048
Patented Oct. 12, 1965

3,211,048
HIGH-INTENSITY SPECTROMETER OF GREAT SELECTIVITY
André Jean Girard, Chatillon-sous-Bagneux, France, assignor to Office National d'Etudes et de Recherches Aerospatiales, a corporation of France
Filed May 25, 1960, Ser. No. 31,690
Claims priority, application France, May 27, 1959, 795,826; June 1, 1959, 796,180; Apr. 20, 1960, 824,819; May 11, 1960, 826,874, Patent 1,249,247
27 Claims. (Cl. 88—14)

Apparatus for revealing the presence of rays having a given wavelength in a radiation comprising a multiplicity of wavelengths are already known. These apparatus or spectrometers are mostly of the optical slit line type in that they comprise an input slit through which the radiation beam to be analyzed is passed and, after passing through a collimator, strikes a dispersive device, for example a prism, producing a variable deflection according to the wavelength, the deflected rays being focused by a collimator onto an output slit positioned in its focal plane, the adjustment of the prism position enabling the operator to direct toward said output slit the radiation component corresponding to a predetermined wavelength.

In apparatus of this character it is essential that the input slit and the output slit constitute the mutual image of each other so that when it is desired to obtain a somewhat higher resolving power—that is, distinguish in the spectrum a relatively narrow wavelength ban—the quantity of light or flux passing through the apparatus is relatively very low, with correspondingly reduced sensitivity.

Attempts have been made with a view to avoiding this difficulty at limiting the working range of apparatus of this character, but the solutions proposed up to now are extremely complicated and therefore costly, and the results obtained therewith are not fully satisfactory, so that their practical utilization has not been extensive.

It is one object of this invention to provide a spectrometer which is as easy to handle and control as a slit spectrometer and has a luminosity—and therefore a sensitivity—considerably higher than that of conventional slit spectrometers.

Another object of the present invention is to provide a spectrometer which is capable of handling quantity of light considerably greater than that processed in conventional slit spectrometers of equally high selectivity.

The invention also contemplates providing a high-luminosity or high-sensitivity spectrometer whereby wavelengths may be scanned with the same facility as with slit spectrometers.

It is also the purpose of the invention to provide means for performing spectrometric operations under such practical conditions that their mode of operation will not be more complex than that of slit spectrometers while preserving the inherent properties and advantages of the spectrometer of this invention, some of which have been broadly set forth hereinabove.

Among the further objects of the present invention is the provision of a high-quality spectrometer of simple general construction and therefore of relatively low cost, considering its performance.

The spectrometer according to this invention is characterized by the presence, at the input end of the apparatus, of at least one gate member providing alternate radiation-transmitting or passage zones and radiation-stopping or no-passage zones for the incident light beam, the relative arrangement and distribution of the passage and no-passage zones being such that the pattern constituted thereby is nonrepetitive in a plane transverse to the path of the light rays, and also by the presence, at the output end of the apparatus, of gate means for producing at least one set of zones constituting a replica of the image of the input pattern as projected through the apparatus. Depending on whether the output member is analgous to a "positive" or a "negative" image of the input member, that is, whether the counterparts of the images of the passage zones of the input member are the passage zones or the no-passage zones of the output member, two emerging beams are obtained which have substantially the same intensity at all frequencies except that for which the spectrometer adjustment causes the input member to form a pattern of light registering with the output member. The energy corresponding to this adjustment wavelength is transmitted in its entirety by the output member when the latter is an analogous or "positive" replica of the image of the input member, or on the contrary is eliminated completely when said output member is the complementary or "negative" replica of the image. The absence or the predominance of the adjustment wavelength in one or the other of said two beams, as well as the equality of the energies corresponding to the other wavelengths in these two beams, results from the relative arrangement and dimensions of the passage and no-passage zones and enables the spectrometric measurement of the adjustment wavelength by either comparing these two beams with each other, or comparing one of these two beams with a third beam having no privileged radiation frequency with respect to the spectrometer.

This invention further contemplates various embodiments of spectrometers according to the principles broadly set forth hereinabove whereby the discrepancy between the energy carried by the first beam and that carried by the second beam may be minimized for each of said other wavelengths, so that the measurement of the difference between the aggregate energies of these two beams by means of one or two radiation receivers arranged in a manner hereinafter set forth constitutes a reliable means for estimating the adjustment wavelength and performing a spectrometrical analysis of the incident beam falling upon the input member.

The adjustment according to a given wavelength is effected with the spectrometer of this invention by simply setting the dispersive system in such a manner that at said wavelength it will project the image of the input member in superimposition upon the output member.

The input and output members may be embodied in relatively simple devices available at a relatively low cost.

According to a typical embodiment, the input member consists of a grid whose interstices or openings provide the passage zones for the light whereas the solid portions betwen these openings constitute the no-passage zones, the output member consisting of a grid which registers with the image of the input grid as projected through the apparatus but wherein the counterparts of the no-passage zones are constituted by mirrors.

This spectrometer may be considered as comprising at its output end or side a first grid constituting the analogue of the image of the input grid as projected through the apparatus with light rays having a particular adjustment wavelength, and another grid which also register with the image of the input grid as projected through the apparatus in inverted manner, i.e. its passage gaps correspond to the no-passage gaps of the input grid and vice versa, this other output grid therefore constituting the negative or complementary analogue of the image of said input grid as projected at the particular wavelength through the apparatus, the spectrometric information delivered by the apparatus consisting of the difference between the beam energies respectively directed through one and the other of said output grids.

In the embodiment broadly set forth hereinabove, wherein the passage or transmission gaps in the first output member are grid openings whereas the passage gaps of the other output member consist of mirrors, the two output beams are obtained simultaneously and may be compared with each other by means of either two receivers or a single receiver of the differential type, or with the assistance of a single receiver onto which the two beams are directed in alternation.

According to another embodiment, the spectrometer input consists of two input grids or like input members according to the general meaning given hereinabove, one input member constituting the negative replica of the other, which are brought alternately into operative condition, the output member consisting in this case of a single grid which is the positive analogue of the image of one of the input grids and the negative image of the other input grid, the beams traversing the two input members being alternately directed onto a single and common receiver.

A further feature of this invention relates to the means for performing in a relatively simple manner the switching or change-over of the input grids in an arrangement of the type just described.

Such means can also be used for the switching of two output grids complementary to each other in the case of a single-input-grid embodiment.

The passage and no-passage zones can also be provided by selective-reflection selective-refraction means. They would further consist of fringes established by an interferometer, so that the apparatus comprises a first interferometer at the input end and another interferometer at the output end; in this case the change-over between one member and its complementary member, which may take place either at the output end or at the input end of the apparatus, is obtained by any known and suitable means for shifting the fringes so as to replace each passage zone by a no-passage zone and vice versa.

More particularly, the passage and no-passage zones may be fringes formed by a compensator consisting of two coupled lenses of bi-refringent material, the apparatus comprising in this case an input compensator and an output compensator operable under polarized-light conditions, with the aid of a rotary analyzer to distinguish the two beams respectively conveying the energies defined hereinabove.

In this specific embodiment, the input compensator gives rise to a fringe system of which the image is formed on the output compensator; this fringe system, comprising light and dark zones that are circular if the cemented surfaces of the compensator are spherical or rectilinear if these surfaces are cylindrical, constitutes a noncorporeal grid based on a principle similar to that of the grid set forth hereinabove, the widths of its fringes being governed by the same laws as those governing the openings and opaque portions of a material grid. (If desired, these fringes could be rendered visible by placing an analyzer just after the input compensator.)

The output compensator, when the analyzer is so located that its axis is parallel to that of the polarizer, shows through this analyzer a first system of light and dark output fringes respectively corresponding to the light and the dark zones of the input fringe system; thus this first output fringe system appears as the positive image of the input fringe system.

The analyzer, upon being so rotated through 90° that its axis becomes perpendicular to that of the polarizer, causes the appearance of another system of light and dark output fringes which conforms to the negative image of the input fringe system; thus, the light and the dark zones of these other output fringes correspond to the dak and the light zones of the input fringe system, respectively. The input fringe system is equivalent to the above-mentioned input grid; the first output fringe system is equivalent to the first output grid designed as the analogue, or positive replica, of the image of the input grid, and the second output fringe system is equivalent to the second output grid designed as the complement, or negative replica of the image of the input grid.

It is to be understood that changes in the specific embodiments of the invention hereinafter disclosed may be made within the scope of what is claimed without departing from the spirit of the invention.

Other objects and advantages will become apparent from the following description taken in conjunction with the accompanying drawing in which:

FIG. 11 is a view showing an input or output member in the case of a further modification;

FIG. 12 is a diagram illustrating the constitution of the member of FIG. 11;

FIG. 13 shows an input or output member equivalent to that shown in FIG. 11;

FIG. 14 shows diagrammatically in front view an input or output member according to a modified embodiment;

FIG. 15 is a diagram for explaining the constitution of this member;

FIG. 16 is a diagram illustrating a spectrometric system comprising an input grid and two output grids;

FIG. 20 is a view similar to FIG. 16 but showing a further modified embodiment;

FIG. 23 is a diagram illustrating a spectrometric system comprising two input grids and one output grid;

FIG. 24 is a front view showing an input member with two permutable grids, suitable for use in the system shown in FIG. 23;

FIG. 25 is a view of the corresponding output member;

FIG. 26 is a diagram illustrating a spectrometer according to another embodiment of this invention;

FIG. 27 is a view similar to FIG. 26 but showing only one portion thereof in another condition of operation;

FIG. 28 is a view showing a rotary disc forming part of the last-mentioned embodiment;

FIG. 29 is a diagram illustrating a grid forming part of the input member of the system shown in FIGS. 26 and 27;

FIG. 30 is a diagram showing another grid forming part of the input member of the spectrometer shown in FIGS. 26 and 27;

FIG. 31 is a diagrammatic view showing a spectrometer according to yet another embodiment of the invention;

FIG. 33 is a view showing a spectrometer according to still another embodiment of the invention;

FIG. 34 is a diagram showing a circular fringe system wherein the fringes are formed by an interferometer forming part of the spectrometer according to the last-mentioned embodiment of the invention;

FIG. 35 is similar to FIG. 34 but shows another modification of the invention;

Figure 1:
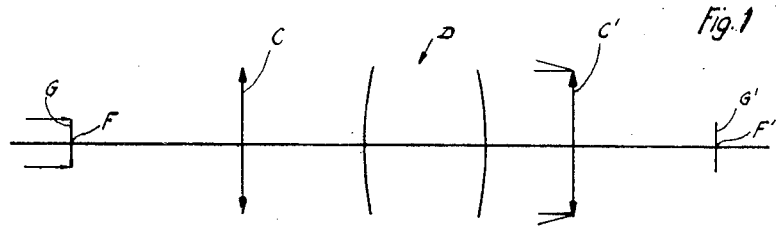
FIG. 1 is a very diagrammatic view showing a spectrometer according to this invention.
Figure 2:
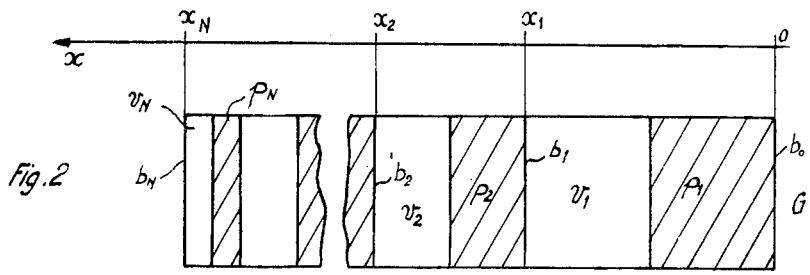
FIG. 2 is a diagram showing on a larger scale an input member or grid forming part of a spectrometer.
Figure 3:
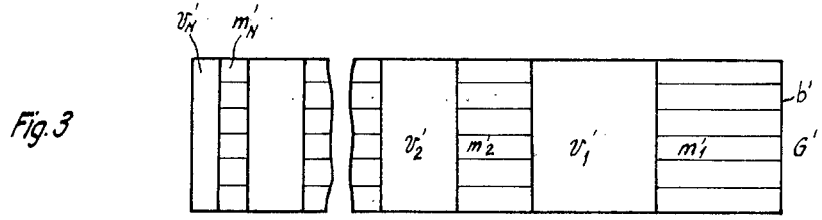
FIG. 3 is a diagrammatic view showing an output grid.

As shown in FIGS. 1 to 5 of the drawing, a spectrometer according to this invention comprises a dispersive system D of conventional type, for example a prism, raster or pattern selected according to the specific applications contemplated, notably according to the wavelengths of the radiation to be analysed; it further comprises an input collimator C and an output collimator C' of the lens or mirror type, also selected according to the wavelengths contemplated. In the focal plane F of the collimator C there is disposed an input member according to this invention, consisting here of a grid G. A typical embodiment of this member is illustrated in FIG. 2. It comprises alternate solid and open portions $p_1$, $p_2$ ... $p_N$ and $v_1$, $v_2$ ... $v_N$, respectively. In the embodiment illustrated in FIG. 2 this input member or grid commences with a solid portion $p_1$ at one end; but it may also begin with an open portion. Besides, the term "solid" designates herein an area through which the radiation cannot pass, and the term "open" means an area through which the radiation may pass without hindrance, or more simply a gap formed between two adjacent solid portions or bars. This input member may advantageously be obtained by depositing on a transparent support an opaque substance delineating the solid portions, the uncoated areas constituting the "openings," "gaps," "blanks" or "intervals."

According to a specific feature of this invention, the relative arrangement and distribution of the solid and open portions are such that the grid thus formed cannot be superimposed upon itself by a movement of translation in a direction at right angles to the longitudinal direction of the bars constituting the grid. A non-uniform arrangement and distribution of the open and solid portions is necessary for yielding a satisfactory result. In an input member of the bar type according to this invention these conditions may be expressed as follows:

(1) the total area of the openings is equal to the total area of the solid portions;

(2) the number of openings is equal to the number of solid portions;

(3) the openings are not equally spaced and their widths are unequal;

(4) one solid portion is followed or preceded by an opening of same width, but this is not an indispensable condition.

In a typical mode of realization the law governing the arrangement and distribution of the solid and open portions is as follows: If, along an abscissa axis having its origin located at 0 and aligned with the outer edge $b_0$, the successive values $x_1$, $x_2$, ... $x_N$ corresponding to the successive edges $b_1$, $b_2$ ... $b_N$ constituting the ends of the couples $p_1$-$v_1$, $p_2$-$v_2$ ... $p_N$-$v_N$ of solid and open portions are plotted, the end abscissa of a couple of row $n$ is given by the formula $$x_n^2 = nx_1^2$$

In this embodiment, each couple $p_1$-$v_1$, $p_2$-$v_2$, ... $p_N$-$v_N$ consists of two equal intervals, one solid and the other empty. It can be shown that in a grid of this type the width $i_x$ of any gap or blank varies substantially according to a hyperbolic law represented by the formula $$i_x = \frac{k}{x}$$

wherein $k$ is a constant equal to $$\frac{x_1^2}{4}$$

$i_x$ varying therefore inversely with the length of the abscissa.

The corresponding output member is obtained as follows: In the focal plane F' of collimator C' there is formed the image of the input member for a transmission of monochromatic light. This image is similar to the inputm grid. Then, in superposition with this image, there is formed an output grid comprising a reflecting surface or mirror $m'_1$ (FIG. 3) which is on the image of $p_1$, a gap or interval $v'_1$, which registers with the image of $v_1$, a reflecting surface or mirror $m'_2$ which is on the image of $p_2$, a gap $v'_2$ which is in line with the image of $v_2$, and so forth, the pattern terminating in a mirror $m'_N$ which registers with the image of $p_N$ and a blank $v'_N$ which coincides with the image of $v_N$.

It will be understood that the blanks or gaps $v_1$, $v_2$ etc. of the input grid may also be shifted so that their images register with the reflecting portions of the output grid which is thus complementary to the input grid.

The input member or grid G is so placed in the focal plane F that its geometrical center is coincident with the axis of collimator C, the edges $b_1$, $b_2$ etc. being directed at right angles to the plane of dispersion of the system D. The grid G' constituted in the manner set forth hereinabove is similarly placed in the focal plane F' of collimator C' whose axis is coincident with its geometrical center, the direction of the edges $b'$ being similarly perpendicular to the plane of dispersion.

If the beam to be submitted to the spectrographic analysis is directed parallel to the axis of collimator C onto the grid G, the dispersive system D will provide (in co-operation with the collimators C and C' of grid G) an infinity or a multiplicity of images in the focal plane F' according to whether the incident beam comprises an infinity or a multiplicity of wavelengths. It is only for a radiation corresponding to a well-defined single wavelength—that it, the adjustment wavelength of the dispersive system D—that the latter gives of the grid G an image exactly superimposed upon the grid G'. The radiations of any other wavelengths give an image of the grid G which is offset with respect to the grid G'.

Figure 4:
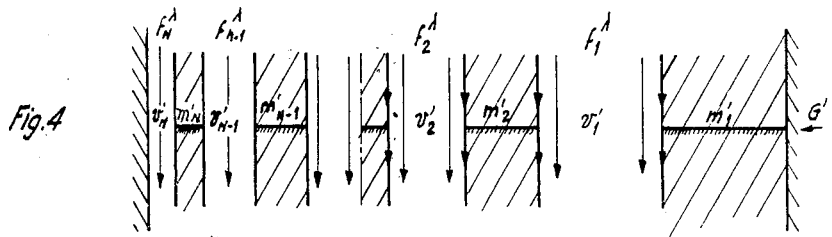
FIG. 4 is a diagram corresponding to a section taken in the vicinity of the output grid, at right angles to the longitudinal direction of the grid openings, to show the light beams or spots passing through this grid with a given adjustment wavelength.
Figure 5:
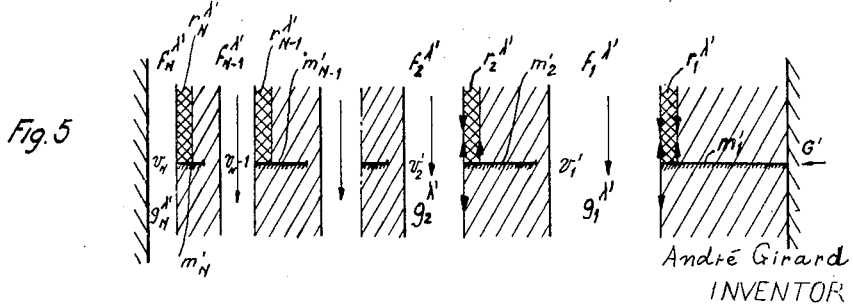
FIG. 5 is a view similar to FIG. 4 for a wavelength close to the preceding one.

The diagram of FIG. 4 (which is a transverse section of the output member G') illustrates the case of radiation having the adjustment wavelength, $\lambda$. For this radiation the beam $f_1^\lambda$ having passed through the blank $v_1$ of grid G passes completely through the grid G' at the blank $v'_1$ thereof which is superimposed upon the image of the blank $v_1$ produced by the spectrometer. All the light of said wavelength $\lambda$ having passed through the blank $v_1$ will pass through the blank $v'_2$ along the beam $f_2^\lambda$, and so forth; the light having passed through the blank $v_N$ of grid G will pass in its entirety through the grid G' at the blank $v'_N$ thereof. To sum up, all the energy of said adjustment wavelength $\lambda$ which has passed through the grid G will also pass through the grid G'.

For another wavelength $\lambda'$ very close to $\lambda$ the dispersive system gives of the grid G an image which is no larger coincident with the grid G'. The beam $f_1^{\lambda'}$ having passed through the blank $v_1$ of grid G is then offset in relation to the blank $v'_1$ of grid G'; for instance, one portion of this beam strikes the reflecting surface $m'_1$ which is to supply a beam of reflected light $r_1^{\lambda'}$ shown by the cross-hatched areas in FIG. 5, the traversing portion $g_1^{\lambda'}$ conveying an energy smaller than that conveyed by the incident beam $f_1^{\lambda'}$ and differing from the latter by the energy now transported by the reflected beam $r_1^{\lambda'}$. The same applies to the incident beam $f_2^{\lambda'}$ divided into a reflected beam $r_2^{\lambda'}$ and a transmitted beam $g_2^{\lambda'}$ conveying only a fraction of the energy conveyed by the beam $f_2^{\lambda'}$, and also to all the incident beams $f_3^{\lambda'} \ldots f_N^{\lambda'}$. To sum up, for a wavelength $\lambda'$, the energy conveyed by the beams $f_1, f_2, \ldots f_N$ is divided into an energy conveyed by the traversing beams $g_1^{\lambda'}, g_2^{\lambda'} \ldots g_N^{\lambda'}$ and an energy conveyed by the reflected beams $r_1^{\lambda'}, r_2^{\lambda'} \ldots r_N^{\lambda'}$.

Figure 6:
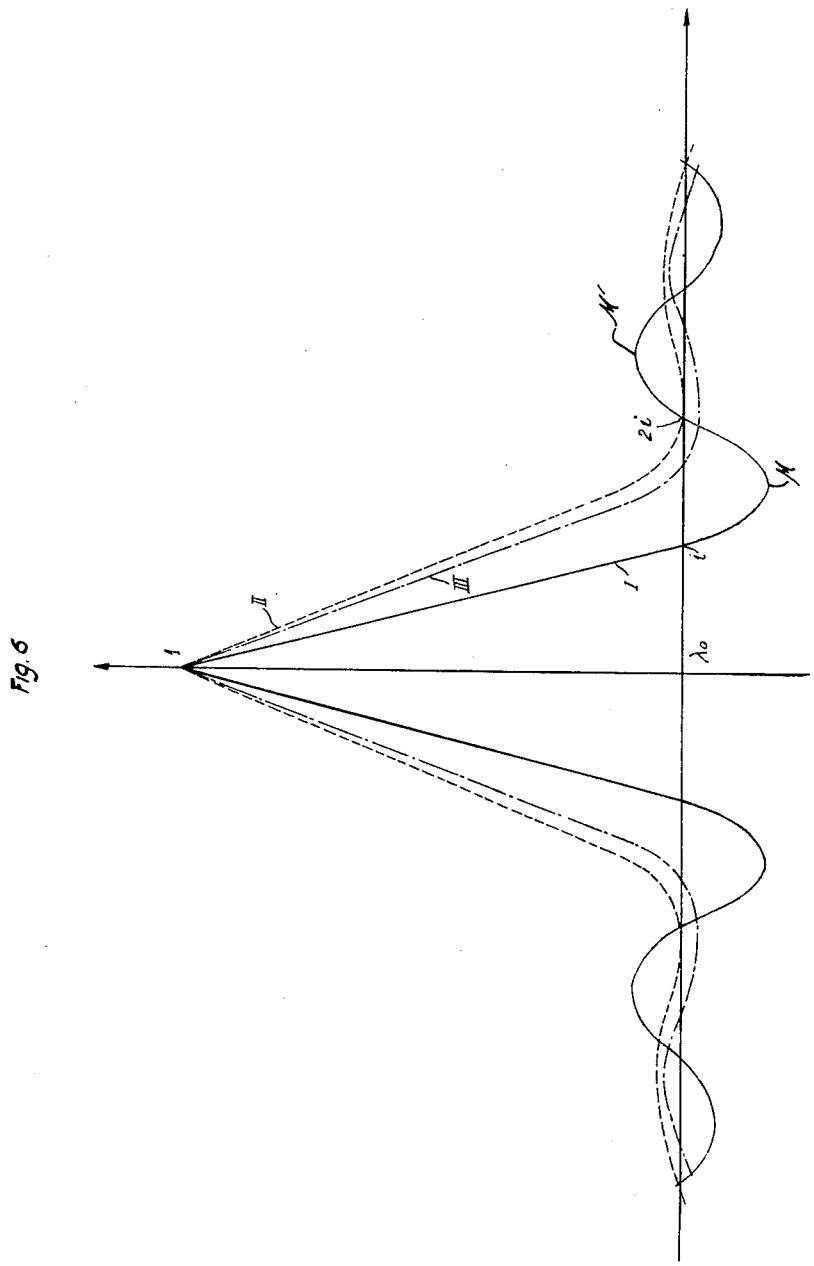
FIG. 6 is a diagram illustrating the separating power of the spectrometer according to this invention in the case of different modifications.

The curve I illustrated in FIG. 6 is a graph of the output signal, that is, the difference between the traversing intensity and the reflected intensity of the output grid for a spectral line of wavelength $\lambda_0$, assumed to be infinitely fine, when the adjustment wavelength is changed. A maximum signal is obtained when the adjustment wavelength is precisely $\lambda_0$; the signal decreases in a substantially linear manner and becomes zero when the image of the input grid with a radiation $\lambda'$ is offset in relation to the adjustment wavelength by a distance $i$. When the adjustment wavelength continues to diverge from $\lambda_0$, the curve passes below the abscissa axis, this corresponding to a reflected energy greater than the traversing energy, and, after having attained an extreme value M, resumes a zero value for a shift equal to $2i$. The curve continues with a series of undulations having their peaks M progressively approaching the abscissa axis.

The width of the total light-transmissive area represented by all the blanks $v_1$ to $v_N$ is given by the expression $$\Sigma i_x = \frac{x_n}{2}$$

If the distance $i$, by which the image of the input grid is offset from the output grid, is equal to $i_N$ (i.e. the width of the smallest blank), then the shifting of the wavelength will reduce the effective width of each blank by the distance $i_N$ so that the width of the light-transmissive area will be reduced by $Ni_N$, the same value $Ni_N$ also denoting the width of the reflective area now available. Since, for $N \gg 1$, $$i_N = \frac{x_1^2}{4x_N}$$

and since $Nx_1^2 = x_N^2$, we can write $$Ni_N = \frac{x_N}{4} \text{ and } \Sigma i_x - Ni_N = \frac{x_N}{4}$$

thus the reflecting and light-transmissive areas will be equal.

In the case of the grids defined hereinabove, therefore, the distance $i$ is equal to the width $i_N$ of the narrowest blank $v_N$. The separating power of the spectrometer according to this invention is therefore substantially equal to that of a slit spectrometer of which the input and output slits had the same width as the narrowest blank of the input grid and of the output grid. On the other hand, the quantity of light, in the spectrometer of this invention, may be several hundred times greater than that passing through the slit of a slit spectrometer, so that the luminosity of the apparatus of this invention is from 100 to 1,000 times greater.

In the case of grids according to the example set forth hereinabove the values of the first three secondary maxima are respectively 17%, 14% and 10% of the central maximum. This invention provides means whereby the magnitude of the secondary maxima or minima shown at $\mu, \mu', \ldots$ etc. in FIG. 6 can be reduced. These means consist of an input grid which, instead of having a rectangular or square configuration as shown in FIG. 7 (to which corresponds the curve I of FIG. 6), has a different configuration as shown in subsequent figures.

Figure 8:
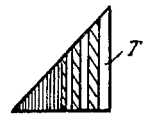
FIGS. 8 and 8A are viewed similar to FIG. 7 but showing modified embodiments.

With the grid illustrated in FIG. 8, which is of substantially triangular configuration as shown at T, and with the same distribution of solid and open portions as in the preceding example, the widest intervals correspond to the longest bars, the value of the first secondary maximum being 4% of the central maximum; the intensity of the other secondary maxima is less than 1% of the central maximum. The corresponding curve is designated by the symbol II in FIG. 6. Then the separating power is that of a conventional spectrometer wherein the slit width is twice the width of the narrowest blank or open portion of the grid.

Figure 8A:
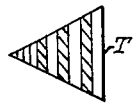

In the embodiment just described the grid has the shape of a right-triangle and its bars are parallel to one side of the right angle. Similar results are obtained, from the point of view of the separating power, by using the modified embodiment shown in FIG. 8A wherein the grid T' has the shape of an isosceles triangle with the bars parallel to the base of this triangle.

Figure 7:
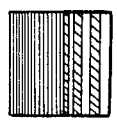
FIG. 7 is a diagrammatic front view of an input grid.
Figure 9:
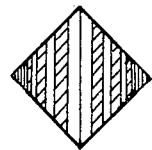
FIG. 9 is a view similar to FIGS. 7 and 8 but showing yet another embodiment of the device.

The same applies to the embodiment shown in FIG. 9, wherein the grid is obtained by juxtaposing two isosceles triangles, the assembly forming a square, but, as distinguished from the embodiment illustrtaed in FIG. 7, in this case the grid bars are parallel to one of the diagonals. The widest intervals are those adjacent to this diagonal.

Figure 10:
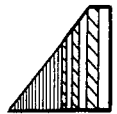
FIG. 10 is a view similar to FIGS. 7 to 9 but showing still another embodiment.

In the embodiment shown in FIG. 10, the grid has the shape of a right-angled trapezoid having its major base six times as large as the minor base. The bars extend at right angles to the bases of the trapezoid and the widest blanks are adjacent to the non-oblique side. The value of the first secondary maximum, with a grid of this type, is less than 3% of the central maximum. The separating power is the same as that of a slit spectrometer wherein the width of the slit is 1.6 times the width of the narrowest blank in the grid (see curve III of FIG. 6).

Reference will now be made to FIG. 11 showing another embodiment of a grid constructed according to the teachings of this invention. This grid is derived from a grid of the type illustrated in FIG. 12 which comprises, inscribed in a rectangle or square having its sides designated by the reference numerals 111, 112, 113 and 114, a series of passage strips 115 and stop strips 116 parallel to the sides 114 and 112, and meeting all the requirements set forth hereinabove. The diagonal 117 is traced. The grid illustrated in FIG. 11 is obtained by coupling a triangle 120, having sides 111 and 114 and a diagonal 117, with a triangle 121 identical with the preceding one but symmetrically inverted relatively thereto with reference to the center of the rectangle. The grid 119 shown in FIG. 11 and formed as explained hereinabove is equivalent to the grid shown in FIG. 13, wherein the strips are distributed exactly as in the manner set forth hereinabove, this grid consisting of an isosceles triangle of a height equal to the side 111, its base being twice the side 114; this triangular grid would be less convenient for use in a spectrometer.

The grid shown in FIG. 14 is obtained by superimposing portions of equal length 122, 123, 124 of a grid 125 (FIG. 15) wherein the passage and stop intervals correspond to the definition given hereinabove, the side 126 of portion 123, being in line with the marginal side 127, whilst the side 128 of portion 124 is in line with sides 126 and 127.

As will be apparent from the diagram of FIG. 16, concerning the spectrometer described hereinabove, the spectrometer input member consists of a grid 10 comprising a succession of blanks or passage zones 11 and solid or no-passage zones 12, the relative arrangement of the blank and solid intervals being that described hereinabove. Adjacent to a blank of a given width is a no-passage zone of like width and this common width varies in order to avoid the possibility of producing a coincidence between the passage and no-passage zones of two superposed grids which were displaced in relation to each other from the position of registry. The aforesaid law of non-linear variation is applicable on the other hand to the couple consisting of one no-passage zone and one passage zone, a couple comprising a solid portion and a blank of like width, as in the embodiment described hereinabove, or to the alternating "solid" and "blank" intervals. The output member consists of a grid 13 comprising a succession of blanks 14 and solids 15, the latter consisting of mirrors, the grid 13 being a replica of the image, as projected through the apparatus, of the grid 10, the blanks 14 coinciding with the images of respective passage zones 11 whilst the mirrors 15 are in line with the images of respective solid zones 12. Therefore, the grid 13 may be considered as consisting of two juxtaposed virtual grids, i.e. a first virtual grid 16 which duplicates the positive image of grid 10 as projected through the apparatus in that its blanks or passage zones 17 correspond respectively to the blanks or passage zones 11 of grid 10, while its solid or no-passage zones 18 of grid 16 correspond respectively to the solid or no-passage zones 12 of grid 10, and a second virtual grid 19 which also resembles the image of grid 10, as projected through the apparatus, but is negative and complementary in that its mirrors or passage zones 20 register with the images of respective no-passage or solid zones 12 of grid 10 whereas its no-passage or solid zones 21 coincide with the images of respective passage zones or blanks 11 of grid 10.

The beam 22 passing through the first virtual output grid 16, that is, through the passage zones 17 thereof, and the beam 23, delivered by the other virtual output grid 19 and resulting from the assembly of beams reflected by the mirrors 20 thereof, produce, by their comparison, the useful signal which may be delivered by a differential receiver 24 of which the two portions 25 and 26 are responsive to beams 22 and 23 respectively.

Figure 17:
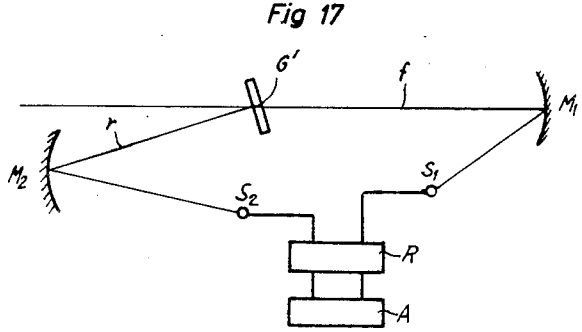
FIG. 17 is a diagram showing the output side of a spectrometer according to a typical embodiment of this feature of the invention.

FIG. 17 illustrates another system embodying the spectrometer of this invention. In this embodiment the transmitted beams $f$ are reflected by a mirror $M_1$ onto a first pickup or radiation detector $S_1$. The reflected beams $r$ are focused by a mirror $M_2$ onto another pickup $S_2$ and the signal delivered by the pickups are fed to an electron device R known per se which determines the difference thereof and delivers this difference to an amplifier A.

Figure 18:
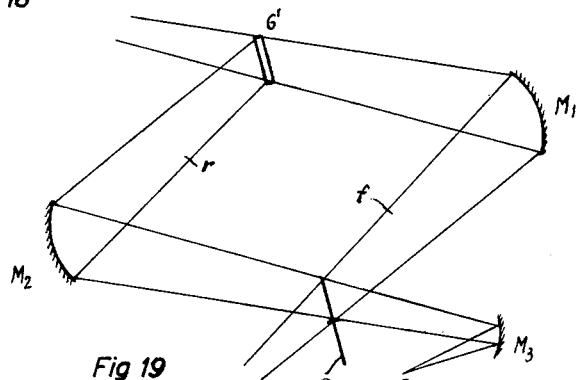
FIG. 18 is a view similar to FIG. 17 but showing a modified embodiment.
Figure 19:
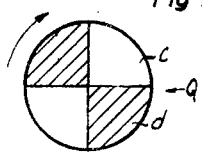
FIG. 19 illustrates in front view a typical shutter for the embodiment of FIG. 18.

In the arrangement illustrated in FIGS. 18 and 19 there is disposed, in front of a single, non-differential pickup S receiving the light focused thereon by a mirror $M_3$, a rotary shutter Q consisting of a disc divided into a number of alternately transparent sectors $c$ and reflecting sectors $d$. The beams $r$ reflected by the mirror $M_2$ strike the cell S when they pass through the transparent portions $c$ of shutter Q, otherwise they are blocked. On the other hand, the beams $f$ strike the cell S by being reflected by the reflecting portions $d$ of shutter Q, whereas otherwise they will not influence this cell. Thus, the cell S receives alternately the energy conveyed by the beam reflected by the output grid G' and the energy conveyed by the transmitted beam. From the signal delivered therefrom another signal representing or corresponding to the difference between these two energies is obtained through known and suitable means.

Similar modes of operation may be used in the embodiment illustrated diagrammatically in FIG. 20 which differs from the embodiment of FIG. 16 only by the fact that the passage zones and the no-passage zones of the output member are reversed. In this specific embodiment the output member 29 may be considered as consisting of two superposed virtual grids, that is, a first virtual grid 30 (which duplicates the positive image of the input grid 10, but wherein the passage zones 31 consist of mirrors separated from one another by no-passage zones 32) and another virtual grid 33 constituting a replica of the negative or complementary image of grid 10, the passage zones 34 of virtual grid 33 being the images of the no-passage zones 12 of grid 10 whilst the no-passage zones 35 of virtual grid 33 are the images of the passage zones 11 of grid 10.

Figure 21:
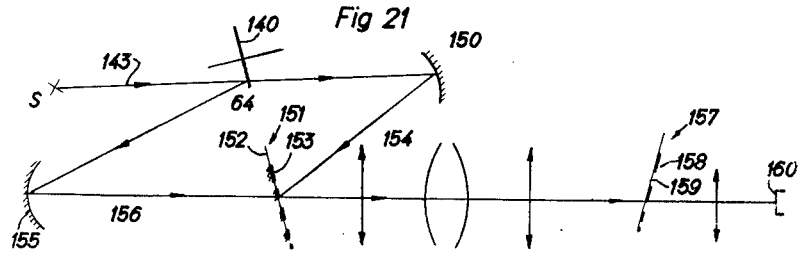
FIG. 21 is a diagram illustrating another embodiment.
Figure 22:
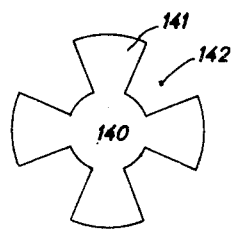
FIG. 22 is a front view showing a member forming part of this embodiment.

In the modified embodiment illustrated in FIG. 21 the source S is disposed in front of a notched disc 140 (FIG. 22) formed with reflecting sectors 141 and permitting the passage through its notched portions 142 of the beam 143 issuing from said source so as to strike a first mirror 150 reflecting this beam toward the input grid 151 consisting of alternate notches 152 and mirrors 153, the beam 154 being subsequently reflected by these mirrors 153 acting in this case like the passage zones of the input member. By reflection on sectors 141, the beam 143 is alternately reflected onto a mirror 155 which casts a beam 156 through the grid 151 whose passage zones consist of the notches or gaps 152. The output member 157 consists of a single grid with solid portions 158 and blanks 159, the latter constituting the passage zones. The beams passing through these passage zones fall alternately onto a simple pickup 160. In this specific embodiment the input member may be considered as consisting of two virtual grids complementary to and superimposed upon each other, the beam passing successively through their passage zones; in one of these virtual grids, the passage zones are the zones which the beam actually traverses, and in the other virtual grid the passage zones are the reflecting zones. The output grid may be the analogue or the complement of the image of one of these two input grids.

In the embodiments described hereinabove the two beams are distinguished by reflection and by simple crossover.

However, other operative actions such as selective reflection and selective refraction may be used therefor.

According to a further modification, the two output beams are delivered from a single output member or grid with which two input members or grids complementary to each other are caused to co-operate alternately. This modification is illustrated diagrammatically in FIG. 23; the input member 40 consists of two members or grids 41, 42 adapted to become alternately operative by virtue of the provision of switching means shown in diagrammatic form at 43, the two grids being complementary to each other in that the passage zones 44 of grid 41 register with the no-passage zones 45 of grid 42, and that the no-passage zones 46 of grid 41 are aligned with the passage zones 47 of grid 42. The output grid 48 consists of a single grid which simulates the positive image of either of grids 41 and 42, so as to present a sequence of passage zones 49 and no-passage zones 50. The two input grids are shown in front diagrammatic view in FIG. 24 and the output grid is shown in FIG. 25. Beyond the output grid 48 there appear alternately in time the two beams with the same optical path leading to a common pickup 53. The latter is provided with an amplifier tuned to the switching frequency of the two input grids.

This invention also provides a modification whereby the input member consists of a single grid and the output member of two grids, one of the output grids simulating the positive image and the other the negative image of the input grid, means being provided for causing these output grids to become operative by turns as the actual output grid for separating the two beams. The means for alternately operating each output grid may be similar to those proposed hereinabove in the case of two input grids.

Means for alternately causing the operation of two input or output members complementary to each other are shown by way of example in FIGS. 26 to 30. Two grids 60 and 61 complementary to each other (and acting as input grids in this case), wherein the passage zones are reflecting zones, are shown diagrammatically in FIGS. 29 and 30, with their passage zones 56 and 57, respectively, and their no-passage zones 58 and 59, respectively, disposed symmetrically on opposite sides of a disc 62 formed with an even number of notches 63 (see FIG. 28) between which the solid portions or sectors 64 have reflecting surfaces on both faces. This disc 62 is rotatable about an axis 65 and so driven that one reflecting sector 64 be replaced by the next one at a frequency F. The flux to be scanned is emitted from a source 66. During the rotation of this disc 62, the input grid 60 and the input grid 61 form in alternation an image in the focal plane of the input collimator 67 of the spectrometer, so that the fluxes delivered beyond this collimator may be considered as issuing by turns from grids 60 and 61. FIG. 26 shows the path of the beam when it is the grid 60 that is operative and FIG. 27 illustrates this path in the operative phase of the grid 61. Beyond the collimator 67 a mirror 68 inclined in relation to the axis of this collimator is placed, and after the flux has passed through the dispersive system 69 it strikes the output grid 70 duplicating the image, as projected through the apparatus, either of the input grid 60 or of the input grid 61 in the focal plane of collimator 67, the output grid 70 being disposed in the focal plane of the output collimator 71. The output member 70 consists of successive passage zones (in this case mirrors 72) and no-passage zones. The output beam is formed by the assembly of beams reflected by the mirrors 72. A lens 73 focuses these beams onto a pickup 74 connected to an amplifier 75 tuned on the aforesaid frequency F.

FIG. 31 illustrates another embodiment of the apparatus which is similar to the one just described, with the only difference that the passage zones of the output grid 76 consist in this case of gaps or openings 77, provided between the no-passage zones, through which the light is caused to pass before striking the pickup 74.

Figure 32:
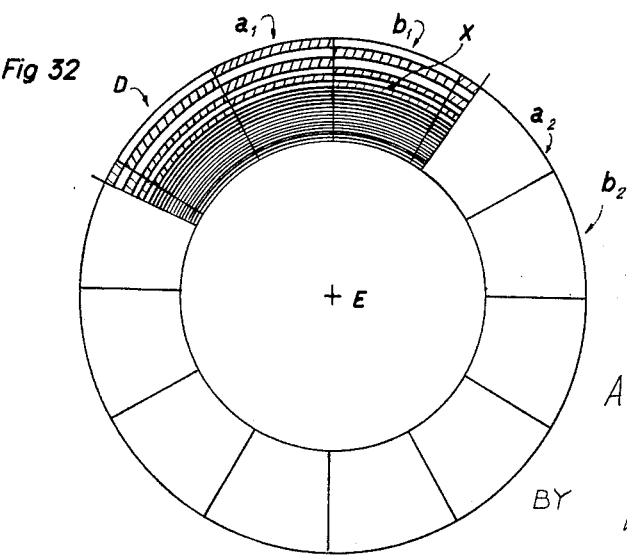
FIG. 32 is a view showing an input or output member of a still further embodiment of the invention.

Reference will now be made to FIG. 32 showing another embodiment of an input or output device. In this case a ring D is divided into a number of sectors each constituting a grid; thus, a grid $a_1$ consisting of alternate open portions and solid portions in the form of circular strips, distributed according to the method set forth hereinabove, is followed firstly by a grid $b_1$ of like characteristics except that the open and solid portions are reversed with respect to the preceding grid, and then by another grid $a_2$ similar to grid $a_1$, then by another grid $b_2$ identical with grid $b_1$, and so forth. The ring D revolves about its center E in any known manner, the mean perimeter of the ring passing through the optical axis $x$ of the spectrometer.

When the input member is constructed in the manner set forth in the preceding paragraph, the output member consists of a single grid centered on the optical axis and having the shape of an annular sector, this grid duplicating the image of either of grids $a_1$ and $b_1$ as projected through the apparatus.

According to a further modification, it is the output member that has a ring-shaped configuration as shown in FIG. 32 and consists of successive sectors similar to the grids $a_1$, $b_1$, etc. of FIG. 32; this ring is rotatable about its axis and its mean intermediate perimeter intersects the optical axis of the spectrometer; the input member consists in this case of a single grid having the shape of an annular sector of which the image projected through the spectrometer corresponds to either one or the other output grid and is centered on the optical output axis of the device.

Reference will now be made to FIG. 33. In this modified embodiment interference fringes are formed in the focal plane of the input collimator 138 with the assistance of an interferometer 130 resulting from the juxtaposition of a plano-convex lens 131 with a parallel-faced blade 132. An interferometer 133 giving a fringe system constituting the positive or negative image of the fringe system delivered by the input interferometer 130 is placed in the focal plane of the output collimator 139. The output beams are focused by a lens 134 onto a pickup 135. Means are provided for periodically switching either at the input end or at the output end one fringe system with its complementary system, these means being adapted to vary the relative spacing between the lens 131 and the blade 132 at the input end, or between the lens 136 and blade 137 constituting the interferometer 133, at the output end.

The nonplanar surfaces of lenses 131 and 136 may be cylindrical or spherical. In the case of spherical surfaces, a system of circular fringes is obtained of which the widths meet the requirements set forth hereinabove. The switching from one fringe system to the complementary fringe system is realized upon passage from a black center to a white center. FIG. 34 illustrates diagrammatically the system of circular fringes thus obtained.

If the nonplanar surfaces of the lenses are cylindrical, a system of rectilinear fringes is obtained, as shown diagrammatically in FIG. 35, which is similar to the system mentioned hereinabove in the case of bi-refringent compensators having cylindrical cementing surfaces.

Figure 36:
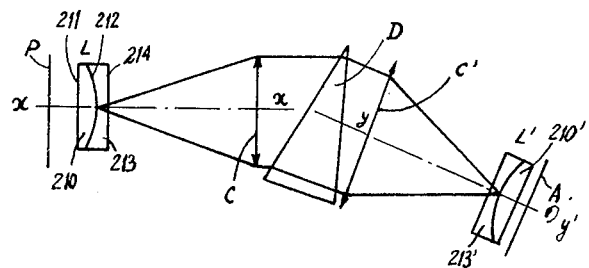
FIG. 36 is a general diagram showing again another embodiment.
Figure 37:
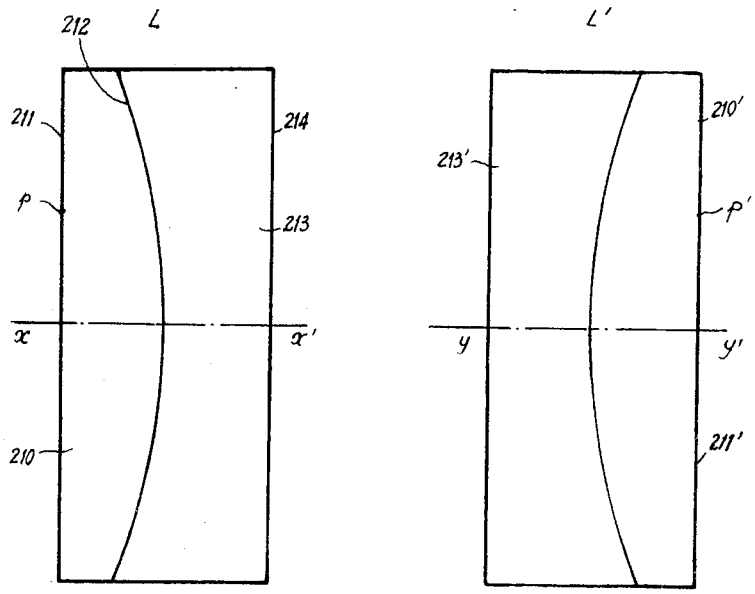
FIG. 37 shows on a larger scale the input and output members of this specific embodiment.

As shown in FIGS. 36 and 37 illustrating another modification, the radiation to be scanned according to the spectrographic method passes firstly through a polarizer P followed by a double bi-refringent blade L of which the composition will be set forth presently. Disposed beyond the blade L is an input collimator C followed in turn by a dispersive device such as a prism D followed by the output collimator C' and by a double bi-refringent blade L', the output of the apparatus consisting of an analyzer or scanner A. Now a few details concerning the composition of the devices incorporated in this apparatus will be given by way of example, together with the description of their relative mounting. The input and output blades L, L' are basically identical from the dual point of view of geometry and optics. The input blade L comprises a first lens 210 (FIG. 37) of bi-refringent material, wtih a flat outer or input face 211 and a spherical opposite face 212. Secured to this plano-convex lens along the face 212 thereof is a plano-concave lens 213 of which the outer face 214 is flat and parallel to the input face 211. These lenses 210 and 213 are made from the same bi-refringent transparent material, the relative angular positions of lenses 210, 213 about their common axis $x$–$x'$ being such that the neutral axes of lens 213 are crossed in relation to the neutral axes of lens 210.

According to a modified form of embodiment, only one of the two coupled lenses is made from bi-refringent material, the other lens consisting of isotropic material.

The polarizer P is so disposed that the characteristic vector of the polarized light passing through it is at 45° from the neutral axes of lenses 210 and 213.

The other or output blade L' has the same composition as blade L, the neutral axes of the plano-concave lens 213', which constitutes the entrance element of blade L', being disposed in the same manner with respect to the output axis $y$–$y'$ of the apparatus as the neutral axes of the output lens 210 with respect to the input axis $x$–$x'$, and the neutral axes of the output lens 210' being disposed in the same manner, with respect to the axis $y$–$y'$, as the neutral axes of the lens 213 with respect to the input axis $x$–$x'$.

In the discussion that follows, which also applies to other embodiments, it is assumed that the dispersive device operates without anamorphosis, that is, as a Littrow's spectrograph or one designed to provide a minimum deflection. In a system of this character, for a radiation of a given wavelength the apparatus comprising the collimators C, C' and prism D gives of the blade L an image which is perfectly coincident with the device L'. With this wavelength, a point $p$ (FIG. 37) of the input face 211 has for its correlative a point $p'$ of the output face 211' of the device L', which is located at the same distance from the axis $y$–$y'$ as is the point $p$ from the axis $x$–$x'$, so that owing to the mirror symmetry of the blades L and L' the difference between the optical paths which is introduced by the blade L when a ray passes through the device at $p$ is compensated by its passage through the other blade L'. This holds true for all the points of the input face 211 and the output face 211', so that the latter constitutes the flat image of the input face 211.

In this position of the dispersion device D the image of blade L projected with this wavelength is coincident with blade L'. On the other hand, the image of blade L projected with another wavelength is not coincident with blade L'; for instance, it may be shifted by a small distance $\epsilon$ along the plane of dispersion. Between the two oscillations involved, which penetrate into the blade L at point $p$, at a distance $z$ from the axis $x$–$x'$, the blade L introduces a difference in the optical path which is equal to $\varphi(z)$ and the other blade L' introduces a difference in the optical path between the two oscillations which is equal to $\varphi(z-\epsilon)$, the light ray passing through the blade L' and corresponding to the light ray passing through the blade L being spaced from the axis $y$–$y'$ by a distance equal to $(z-\epsilon)$ due to the shifting of the image of L with respect to the blade L'. Now, blade L' and blade L are so designed that the function $\varphi(z)$ is not a constant as a function of $z$ and does not vary linearly with respect to $z$. Therefore the difference in the optical path $\varphi(z-\epsilon)$ introduced by the blade L' differs from that of the optical path $\varphi(z)$ introduced by the other blade L, so that it will not compensate the latter. The resulting discrepancy in the optical paths $[\varphi(z)-\varphi(z-\epsilon)]$ is not a constant. For the wavelength considered herein, which differs from the adjustment wavelength, fringes will appear behind the analyzer.

A radiation detector disposed behind the rotary analyzer or scanner A will receive a modulated flux, that is, the flux corresponding to the adjustment wavelength, and a practically non-modulated flux of the other wavelengths. An amplification of the alternating component of the signal delivered by the detector will isolate the signal corresponding to the adjustment wavelength.

According to a further modification, the input blade and the output blade, instead of having an axial symmetry as in the preceding embodiment, have a plane symmetry, as is the case with the dispersive device with which they constitute the spectrometer of this invention. In this case the input and output blades, instead of being identical from the geometrical point of view, are homothetic. Thus, an advantageous magnification effect is obtained which may prove particularly useful in certain applications.

This invention is also concerned with embodiments wherein the input and output bi-refringent blades consist of a single member or lens, the term "lens" being taken in its broadest meaning, wtih a cylindrical, plane or spherical input or output face, provided only that it introduces discrepancies in the optical paths that are variable in a non-linear manner according to the intersection of the dispersion plane with said face.

The progressiveness of the passage from a dark zone to a light zone and vice versa, which is provided by using a fringe system, is also applicable to an input or output device of the type comprising alternate solid portions and blank or open portions.

In the preceding embodiments, the spectrometric apparatus shows at its output end two flux portions of which one conveys substantially the whole of the energy corresponding to the ajustment wavelength of the spectrometer and substantially the sum of one half of the energies of the other wavelengths, the second portion of the flux conveying practically zero energy of the adjustment wavelength and substantially the sum of the other half of the energies of the other wavelengths, the spectrometric analysis resulting from the comparison of the two flux portions.

This invention is also concerned with a typical embodiment whereby the spectrometric analyses or scanning results from the comparison of only one or the other of the two flux portions mentioned hereinabove with a third flux portion in which the adjustment wavelength is not privileged, in one or the other direction, with respect to the other wavelengths.

This mode of realization may be particularly advantageous when it is desired to use a particularly simple construction, but its sensitivity is lower than that of the other embodiments, although it is still greater than that of conventional spectrometers.

Figure 38:
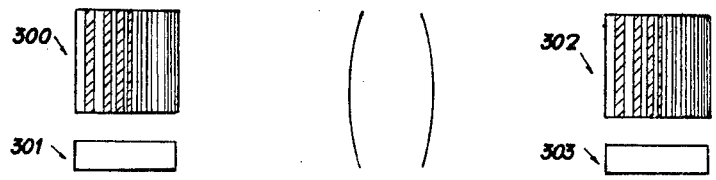
FIG. 38 is a very diagrammatic illustration of a still further modified embodiment.

As shown in FIG. 38 illustrating an embodiment of this character, the input device comprises an input element 300 shown by way of example as consisting of a member comprising alternate solid and blank portions, or passage zones and no-passage zones, as in the preceding embodiments. Let U be the surface of the assembly of these zones or portions; the input member then comprises in addition a window 301 the passage area of which is equal to $U/4$. If J be the light flux passing through this member 300, the light flux passing through the window 301 is $J/2$ (assuming that the flux is distributed in a homogeneous manner transversely of the beam), with due consideration for the fact that the passage intervals of member 300 occupy only one-half of the surface of said member. The output device consists of an output member 302 simulating the positive or negative image, as projected through the apparatus, of the input member 300, well as of an output window 303 simulating the image of the window 301 as projected through the apparatus, the surface of this window being similarly one-fourth of that of the output member 302.

Under these conditions, for all wavelengths $\lambda_n$ other than the adjustment wavelength $\lambda_0$, the flux transmitted by the output member 302 will be equal to $$\sum_n \frac{j_{\lambda_n}}{2}$$

wherein $j_{\lambda_n}$ is the flux conveyed on the wavelength $\lambda_n$, and the flux passing through the window 303 is also $$\sum_n \frac{j_{\lambda_n}}{2}$$

For the adjustment wavelength $\lambda_0$, in case the member 302 duplicates the positive image of member 300, the flux transmitted by the member 302 is $j_{\lambda_0}$ and the flux transmitted through the window 303 is $$\frac{j_{\lambda_0}}{2}$$

The comparison of the aggregate fluxes transmitted both on the wavelengths $\lambda_n$ other than the adjustment wavelength and on the adjustment wavelength $\lambda_0$, on the one hand through the output member 302 (to constitute a first portion of the flux) and on the other hand through the window 303 (to constitute the third portion of the flux) shows the value $$\frac{j_{\lambda_0}}{2}$$

and constitutes a measurement of the flux on the adjustment wavelength.

This comparison may also take place between the third portion of the flux and a second portion of the flux which were transmitted by an output member complementary to the one just considered.

The third window portion of the flux, instead of being formed by a window, as in the above-described embodiment, may be obtained by utilizing an output member which suppresses over a convenient surface area the selective power of this member.

This specific mode of realization is applicable to the different types of input and output members described hereinabove and shown in the accompanying drawing, including those utilizing fringes with polarized or non-polarized light.

I claim:

1. A spectrometric apparatus comprising on opposite sides of a dispersive projection system an input member provided with a series of alternate transmitting zones and non-transmitting zones forming in a transverse plane a pattern which is non-repetitive and wherein the zones of each type progressively vary in width in a direction parallel to the intersection of said transverse plane with the dispersion plane of said system, and an output member provided with a series of alternate transmitting zones and non-transmitting zones which register exactly with the images, of respective zones, of said input member as projected by said system with a predetermined adjustment wavelength, and pickup means responsive to the flux issuing from said output member.

2. An apparatus as set forth in claim 1 wherein said transmitting zones of said input member and of said output member are voids and said non-transmitting zones of said input member are solid portions, the images of the input-member voids as projected by said system with said adjustment wavelength coinciding with the voids of said output member, the non-transmitting zones of said output member being reflecting surfaces registering with the images of the solid portions of said input member as projected by said system with said adjustment wavelength.

3. A spectrometric apparatus comprising on opposite sides of a dispersive projection system an input member provided with a series of alternate transmitting zones and non-transmitting zones forming in a transverse plane a pattern which is non-repetitive and wherein the zones of each type differ in width from one another in a direction parallel to the intersection of said transverse plane with the dispersion plane of said system, and an output member provided with a series of alternate transmitting zones and non-transmitting zones which register exactly with the images of respective zones of said input member as projected by said system with a predetermined adjustment wavelength, and pickup means responsive to the flux issuing from said output member, said input member consisting of a sequence of alternate openings and solid portions and said output member consisting of a sequence of reflecting surfaces and voids, said reflecting surfaces registering with the images of said openings as projected by said system with said adjustment wavelength, said voids coinciding with the identically projected images of said solid portions.

4. An apparatus for the spectrometric analysis of a flux of radiation, comprising an input member, an input collimator, a dispersive system, an output collimator and an output member successively positioned in the path of a flux to be analyzed; said input member comprising two alternately interleaved multiplicities of zones, the zones of one multiplicity differing from those of the other multiplicity in their transmissivity for radiation respectively impinging thereon, the total surface area of the zones of one multiplicity substantially equaling the total surface area of the zones of the other multiplicity, said zones forming a non-repetitive pattern in the direction of the spreading of the spectral bands by said dispersive system; said output member comprising two alternately interleaved multiplicities of zones, the zones of one multiplicity differing from those of the other multiplicity in their transmissivity for radiation respectively impinging thereon, any zone of one multiplicity of said output member coinciding with the mage of a respective zone of one multiplicity of said input member as projected by the combination of said collimators and said dispersive system with radiation having a predetermined adjustment wavelength; and receiver means responsive to radiation delivered by said output member after passage through said input member, said collimators and said dispersive system.

5. An apparatus for the spectrometric analysis of a flux of radiation, comprising an input member, an input collimator, a dispersive system, an output collimator and an output member successively positioned in the path of a flux to be anaylzed; said input member comprising two alternately interleaved multiplicities of zones, the zones of one multiplicity transmitting impinging radiation in substantially uniform manner toward said dispersive system, the zones of said second multiplicity blocking the passage of impinging radiation toward said dispersive system, the total surface area of the zones of one multiplicity substantially equaling the total surface area of the zones of the other multiplicity, said zones forming a non-repetitive pattern in the direction of the spreading of the spectral bands by said dispersive system; said output member comprising two alternately interleaved multiplicities of zones, the zones of one multiplicity differing from those of the other multiplicity in their transmissivity for radiation respectively impinging thereon, any zone of one multiplicity of said output member coinciding with the image of a respective zone of said first multiplicity as projected by the combination of said collimators and said dispersive system with radiation having a predetermined adjustment wavelength; and receiver means responsive to radiation delivered by said output member after passage through said input member, said collimators and said dispersive system.

6. An apparatus for the spectometric analysis of a flux of radiation, comprising an input member, an input collimator, a dispersive system, an output collimator and an output member successively positioned in the path of a flux to be analyzed; said input member comprising two alternately interleaved multiplicities of zones including a first and a second multiplicity, the zones of said first multiplicity transmitting impinging radiation in substantially uniform manner toward said dispersive system, the zones of said second multiplicity blocking the passage of impinging radiation toward said dispersive system, the total surface are of the zones of said first multiplicity substantially equaling the total surface area of the zones of said second multiplicity, said zones forming a non-repetitive pattern in the direction of the spreading of the spectral bands by said dispersive system; said output member comprising two alternately interleaved multiplicities of zones including a third and a fourth multiplicity, the zones of said third multiplicity differing from those of said fourth multiplicity in their transmissivity for radiation respectively impinging thereon, any zone of one multiplicity of said output member coinciding with the image of a respective zone of said first multiplicity as projected by the combination of said collimators and said dispersive system with radiation having a predetermined adjustment wavelength; and receiver means responsive to radiation delivered by both said third and fourth multiplicities after passage through said input member, said collimators and said dispersive system.

7. An apparatus according to claim 6 wherein the zones of said first multiplicity are transparent, the zones of said third multiplicity of the output member are transparent and the zones of said fourth multiplicity are reflective.

8. An apparatus for the spectrometric analysis of a flux of radiation, comprising an input member, an input collimator, a dispersive system, an output collimator and an output member successively positioned in the path of a flux to be analyzed, said input member comprising first gate means and second gate means; said first gate means comprising two alternately interleaved multiplicities of zones including a first and a second multiplicity, the zones of said first multiplicity transmitting impinging radiation toward said dispersive system, the zones of said second multiplicity blocking the passage of impinging radiation toward said dispersive system, the total surface area of the zones of said first multiplicity substantially equaling the total surface area of the zones of said second multiplicity and forming therewith a non-repetitive pattern in the direction of the spreading of the spectral bands by said dispersive system; said second gate means being juxtaposed with said first gate means and comprising two alternately interleaved multiplicities of zones including a third, and a fourth multiplicity, the zones of said third multiplicity being aligned with those of said first multiplicity for blocking the passage of impinging radiation toward said dispersive system, the zones of said fourth multiplicity being aligned with those of said second multiplicity for transmitting impinging radiation toward said dispersive system; means for alternately rendering operative said first and said second gate means; said output member comprising two alternately interleaved multiplicities of zones including a fifth and a sixth multiplicity, the zones of said fifth multiplicity transmitting impinging radiation in substantially uniform manner, the zones of said sixth multiplicity stopping impinging radiation, any zone of one multiplicity of said output member coinciding with the image of one zone of one multiplicity of said input member as projected by the combination of said collimators and said dispersive system with radiation having a predetermined adjustment wavelength; and receiver means responsive to radiation transmitted by the zones of said fifth multiplicity.

9. A spectrometric apparatus, comprising an input member, an input collimator, a dispersive system, an output collimator and an output member successively positioned in the path of a flux of radiation to be analyzed, said input member comprising a first multiplicity of transparent strips arranged substantially perpendicular to the direction of spreading of the spectral bands by said dispersive system, and a second mutliplicity of opaque, non-reflecting strips alternately interleaved with the strips of said first multiplicity, the width of a strip of one multiplicity equaling the width of an adjacent strip of the other multiplicity, the strip widths in each multiplicity differing from one another; said output member comprising a third multiplicity of transparent strips arranged substantially perpendicular to said direction of spreading of the spectral bands and a fourth multiplicity of reflecting strips alternately interleaved with the strips of said third multiplicity, any strip of each multiplicity of said output member being aligned and coincident with the image of one strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

10. A spectrometric apparatus, comprising an input member, an input collimator, a dispersive system, an output collimator and an output member successively positioned in the path of a flux of radiation to be analyzed, said input member comprising a first multiplicity of transparent strips arranged substantially perpendicular to the direction of spreading of the spectral bands by said dispersive system, and a second multiplicity of non-transparent, non-reflecting strips alternately interleaved with the strips of said first multiplicity, the widths of the strips of each multiplicity differing among one another, the total surface area of the strips of one multiplicity substantially equaling the total surface area of the strips of the other multiplicity; said output member comprising a third multiplicity of transparent strips arranged substantially perpendicular to said direction of spreading of the spectral bands and a fourth multiplicity of reflecting strips alternately interleaved with the strips of said third multiplicity, any strip of each multiplicity of said output member being aligned and coincident with the image of a strip of a respective multiplicity of said input member as projected by the combination of said collimators and said dispersive system with radiation having a predetermined adjustment wavelength; and receiving means responsive to two beams of radiation respectively delivered by said third and fourth multiplicities of strips.

11. A spectrometric apparatus comprising an input member, an input collimator, a dispersive system, an output collimator and an output member successively positioned in the path of flux of radiation to be analyzed, said input member comprising a first multiplicity of transparent strips arranged substantially perpendicular to the direction of spreading of the spectral bands by said dispersive system, and a second multiplicity of opaque, non-reflecting strips alternately interleaved with the strips of said first multiplicity, the width of a strip of one multiplicity, the width of a strip of one multiplicity equaling the width of an adjacent strip of the other multiplicity, the strip widths of each multiplicity being different from one another and varying progressively according to a non-linear law as a function of their distance from one of the edges of said input member; said output member comprising a third multiplicity of transparent strips substantially perpendicular to said direction of spreading of the spectral bands, and a fourth multiplicity of reflecting strips alternately interleaved with the strips of said third multiplicity, any strip of each multiplicity of said output member being aligned and coincident with the image of a strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

12. A spectrometric apparatus, comprising an input member, an input collimator, a dispersive system, an output collimator and an output member successively positioned in the path of a flux of radiation to be analyzed, said input member comprising a first multiplicity of transparent strips arranged substantially perpendicular to the direction of spreading of the spectral bands by said dispersive system, and a second multiplicity of opaque, non-reflecting strips alternately interleaved with the strips of said first multiplicity, the width of a strip of one multiplicity equaling the width of an adjacent strip of the other multiplicity, the strip widths of each multiplicity being different from one another and varying progressively according to a hyperbolic law as a function of their distance from one of the edges of said input member; said output member comprising a third multiplicity of transparent strips substantially perpendicular to said direction of spreading of the spectral bands, and a fourth multiplicity of reflecting strips alternately interleaved with the strips of said third multiplicity, any strip of each multiplicity of said output member being aligned and coincident with the image of a strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

13. A spectrometric apparatus comprising an input member, an input collimator, a dispersive system, an output collimator and an output member successively positioned in the path of a flux of radiation to be analyzed; said input member being of rectangular configuration with edges respectively parallel and perpendicular to the direction of spreading of the spectral bands by said dispersive system, said input member comprising a first multiplicity of transparent strips perpendicular to said direction of spreading of the spectral bands, and a second multiplicity of opaque, non-reflecting strips alternately interleaved with the strips of said first multiplicity, the width of a strip of one multiplicity equaling the width of an adjacent strip of the other multiplicity, the widths of the strips of each multiplicity differing among one another; said output member comprising a third multiplicity of transparent strips perpendicular to said direction of spreading of said spectral bands and a fourth multiplicity of reflecting strips alternately interleaved with the strips of said third multiplicity, any strip of each multiplicity of said output member being aligned and coincident with the image of one strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

14. A spectrometric apparatus comprising an input member, an input collimator, a dispersive system, an output collimator and an output member successively positioned in the path of a flux of radiation to be analyzed, said input member being of triangular outline with one edge perpendicular to the direction of spreading of the spectral bands by said dispersive system, said input member comprising a first multiplicity of transparent strips perpendicular to said direction of spreading of the spectral bands, and a second multiplicity of opaque, non-reflecting strips alternately interleaved with the strips of said first multiplicity, the width of a strip of one multiplicity equaling the width of an adjacent strip of the other multiplicity; said output member comprising a third multiplicity of transparent strips perpendicular to said direction of spreading of the spectral bands, and a fourth multiplicity of reflecting strips alternately interleaved with the strips of said third multiplicity, any strip of each multiplicity of said output member being aligned and coincident with the image of one strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

15. A spectrometric apparatus comprising an input member, an input collimator, a dispersive system, an output collimator and an output member successively positioned in the path of a flux of radiation to be analyzed, said input member being of triangular outline with one edge parallel to the direction of spreading of the spectral bands by said dispersive system and with another edge perpendicular to said direction, said input member comprising a first multiplicity of transparent strips perpendicular to said direction of spreading of the spectral bands, and a second multiplicity of opaque, non-reflecting strips alternately interleaved with the strips of said first multiplicity, the widths of the strips of each multiplicity differing from one another; said output member comprising a third multiplicity of transparent strips perpendicular to said direction of spreading of the spectral bands, and a fourth multiplicity of reflecting strips alternately interleaved with the strips of said third multiplicity, any strip of each multiplicity of said output member being aligned and coincident with the image of one strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

16. A spectrometric apparatus comprising an input member, an input collimator, a dispersive system, an output collimator and an output member successively positioned in the path of a flux of radiation to be analyzed, said input member being of rhomboidal outline with edges inclined with respect to the direction of spreading of the spectral bands by said dispersive system, said input member comprising a first multiplicity of transparent strips perpendicular to said direction of spreading of the spectral bands, and a second multiplicity of opaque, non-reflecting strips alternately interleaved with the strips of said first multiplicity, the widths of the strips of each multiplicity being all different from one another; said output member comprising a third multiplicity of transparent strips perpendicular to said direction of spreading of the spectral bands and a fourth multiplicity of reflecting strips alternately interleaved with the strips of said third multiplicity, any strip of each multiplicity of said output member being aligned and coincident with the image of a strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

17. A spectrometric apparatus comprising an input member, an input collimator, a dispersive system, an output collimator and and output member successively positioned in the path of a flux of radiation to be analyzed, said input member being of trapezoidal outline with bases which are parallel to the direction of spreading of the spectral bands by said dispersive system, said input member comprising a first multiplicity of transparent strips perpendicular to said direction of spreading of the spectral bands, and a second multiplicity of opaque, non-reflecting strips alternately interleaved with the strips of said first multiplicity, the widths of the strips of each multiplicity differing from one another; said output member comprising a third multiplicity of transparent strips perpendicular to said direction of spreading of the spectral band and a fourth multiplicity of reflecting strips alternately interleaved with the strips of said third multiplicity, any strip of each multiplicity of said output member being aligned and coincident with the image of a strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

18. A spectrometric apparatus comprising an input member, an input collimator, a dispersive system, an output collimator and an output member successively positioned in the path of a flux of radiation to be analyzed, said input member comprising a multiplicity of transparent rectilinear strips, perpendicular to the direction of spreading of the spectral bands by said dispersive system, and a second multiplicity of opaque and non-reflecting strips alternately interleaved with the strips of said first multiplicity, the widths of the strips of each multiplicity differing from one another, the strips being disposed in two right triangles constituting two halves of a rectangle separated by a diagonal thereof, the strips of one triangle being symmetrically disposed relatively to the strips of the other triangle with reference to the center of the rectangle; said output member comprising a third multiplicity of transparent strips perpendicular to said direction of spreading of the spectral bands and a fourth multiplicity of reflecting strips alternately interleaved with the strips of said third multiplicity, any strip of each multiplicity of said output member being aligned and coincident with the image of a strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

19. A spectrometric apparatus comprising an input member, an input collimator, a dispersive system, an output collimator and an output member successively positioned in the path of a flux of radiation to be analyzed, said input member being of rectangular configuration with edges respectively parallel and perpendicular to the direction of spreading of the spectral bands by said dispersive system, said input member comprising a multiplicity of transparent strips perpendicular to said direction of spreading of the spectral bands, and a second multiplicity of opaque and non-reflecting strips alternately interleaved with the strips of said first multiplicity, the widths of the strips of each multiplicity differing from one another, said strips being distributed in a plurality of juxtaposed rectangles; said output member comprising a third multiplicity of transparent strips perpendicular to said direction of spreading of the spectral bands and a fourth multiplicity of reflecting strips alternately interleaved with the strips of said third multiplicity, any strip of each multiplicity of said output member being aligned and coincident with the image of a strip of a respective multiplicity of said input member as projected by the combination of said collimators and said dispersive system with radiation having a predetermined adjustment wavelength; and receiver means responsive to two beams of radiation respectively delivered by said third and fourth multiplicities of strips.

20. An apparatus for the spectrometric analysis of a flux of radiation, comprising an input member, an input collimator, a dispersive system, an output collimator and an output member successively positioned in the path of a flux to be analyzed, said output member registering with the image of said input member as projected with a predetermined adjustment wavelength by the combination of said collimators and said dispersive system, said output member delivering two beams of radiation, one of said beams carrying substantially the entire energy of the flux transmitted by said input member on said adjustment wavelength as well as substantially one-half of the energies conveyed on each of the other wavelengths of the flux so transmitted, the other of said beams being substantially free from any energy conveyed on said adjustment wavelength but carrying substantially all of the remaining one-half of the energies conveyed on each of said other wavelengths by said flux.

21. An apparatus according to claim 20, further comprising a differential radiation receiver having a first portion positioned to receive said one of said beams and a second portion positioned to receive said other of said beams.

22. An apparatus according to claim 20, further comprising radiation-responsive receiver means and switchover means in the path of said beams for alternately directing radiant energy thereof onto said receiver means.

23. An apparatus according to claim 20, further comprising radiation-responsive receiver means, switchover means in the path of said beams for alternately directing radiant energy thereof onto said receiver means at a predetermined switching frequency, and amplifier means coupled to the output of said receiver means and tuned to said switching frequency.

24. An apparatus according to claim 20, further comprising two radiation-responsive receivers and means in the path of said beams for respectively directing radiant energy thereof onto said receivers.

25. A spectrometer for analyzing the wavelength composition of a polychromatic beam emitted by a source of optically focusable radiation, comprising an optical system aligned with said source, said system including dispersion means for the rays of said beam, first gate means ahead of said dispersion means at the entrance side of said beam, and second gate means beyond said dispersion means at the exit side of said beam; said first gate means constituting a first pattern of two alternately interleaved sets of zones of different transmissivity for said rays, said zones following one another in a direction transverse to said rays and differing in width within each of said sets; said system further including collimator means for forming said rays into images of said zones beyond said dispersion means; said second gate means constituting a related second pattern of two alternately interleaved sets of zones of different transmissivity positioned to register with respective images of the zones of said first pattern formed by said collimator means with rays of a particular wavelength.

26. A spectrometer for analyzing the wavelength composition of a polychromatic beam emitted by a source of optically focusable radiation, comprising an optical system aligned with said source, said system including dispersion means for the rays of said beam, first gate means ahead of said dispersion means at the entrance side of said beam, and second gate means beyond said dispersion means at the exit side of said beam; said first gate means constituting a first pattern of two alternately interleaved sets of zones of different transmissivity for said rays, said zones following one another in a direction transverse to said rays and differing in width within each of said sets; said system further including collimator means for forming said rays into images of said zones beyond said dispersion means; said second gate means constituting a related second pattern of two alternately interleaved sets of zones positioned to register with respective images of the zones of said first pattern formed by said collimator means with rays of a particular wavelength, the zones of the sets of said second pattern differing in their ability to transmit rays along a predetermined path; control means for respectively directing equal quantities of radiant energy from said beam over said predetermined path by way of said first and second patterns and over an alternate path including at least one of said patterns whereby two separate outputs differing in their content of said particular wavelength are produced; and comparison means positioned at the ends of said paths for receiving said outputs and weighing their contents of radiant energy against each other.

27. A spectrometer for analyzing the wavelength composition of a polychromatic beam emitted by a source of optically focusable radiation, comprising an optical system aligned with said source, said system including dispersion means for the rays of said beam, first gate means ahead of said dispersion means at the entrance side of said beam, and second gate means beyond said dispersion means at the exit side of said beam; one of said gate means constituting a first pattern of two alternately interleaved sets of zones of different transmissivity for said rays, said zones following one another in a direction transverse to said rays and differing in width within each of said sets; the other of said gate means constituting a pair of mutually complementary second patterns each related to said first pattern and consisting of two alternately interleaved sets of zones of different transmissivity, said system further including collimator means for correlating said first pattern with each of said second patterns by forming said rays into images of the zones of said first gate means respectively registering with the zones of said second gate means at a particular wavelength of said rays; control means for respectively directing equal quantities of radiant energy from said beam over two paths through said system, each of said paths including said first pattern and a respective one of said second patterns; and comparison means positioned at the ends of said paths for receiving said outputs and weighing their contents of radiant energy against each other.

References Cited by the Examiner

UNITED STATES PATENTS

| | | | |
|---|---|---|---|
| 818,966 | 4/06 | Ives | 88—1 |
| 1,455,825 | 5/23 | Wood | 88—14 |
| 1,792,046 | 2/31 | Skaupy | 88—14 |
| 2,016,036 | 10/35 | Fitz Gerald | 250—41.5 |
| 2,463,280 | 3/49 | Kaehni et al. | 88—1 |
| 2,874,608 | 2/59 | Beloian | 88—14 |
| 2,948,185 | 8/60 | Ward et al. | 88—14 |

JEWELL H. PEDERSEN, *Primary Examiner.*

EMIL G. ANDERSON, *Examiner.*